Oct. 7, 1969

S. EISLER 3,471,222

EYEGLASSES HAVING LENSES RESILIENTLY SECURED
IN A GROOVED HALF FRAME

Filed Oct. 11, 1966

INVENTOR:
SIDNEY EISLER

BY
Breitenfeld & Levine
ATTORNEYS

United States Patent Office 3,471,222
Patented Oct. 7, 1969

3,471,222
EYEGLASSES HAVING LENSES RESILIENTLY SECURED IN A GROOVED HALF FRAME
Sidney Eisler, 80 Riverside Drive, New York, N.Y. 10024
Filed Oct. 11, 1966, Ser. No. 585,792
Int. Cl. G02c 7/02, 1/04
U.S. Cl. 351—61                           2 Claims

ABSTRACT OF THE DISCLOSURE

An eyeglass frame comprising a bridge portion having depending legs and oppositely extending arms at ends of the legs is integrally molded of resilient plastic. Each leg and arm is provided with an open-sided slot terminating in end walls arranged at acute angles to bottom wall of slot. A lens is received in each slot, with the peripheral length of the lens being greater than length of slot bottom wall, so that the resilience of the frame holds lens in place. A block may be located in the slot to reduce its effective length.

---

This invention relates generally to eyeglasses of the type having narrow lenses, sometimes referred to as half-lenses, so that the wearer easily may look over the top edge of the lenses. More particularly, the invention pertains to eyeglasses in which the lenses are releasably connected to the frame without the use of external fastening devices.

Presently, many people whose close vision is deficient due to age wear narrow lens eyeglasses to aid them in seeing close objects but allowing them to see over the lenses to view distant objects. These eyeglasses usually comprise a frame which mounts a pair of lenses, the vertical dimension of which is substantially smaller than the corresponding dimension of lenses used in conventional eyeglasses. The lenses are positioned so that the line of vision passes through the lenses when the wearer looks downwardly but the line of vision is spaced above the lenses when the wearer looks straight ahead or upwardly. Thus, the wearer may obtain the required magnification correction for viewing his work by looking downwardly and, further, he may look at distant objects without encountering any distortion introduced by a lens simply by looking ahead (i.e., above the top edges of the narrow lenses). In view of the foregoing, eyeglasses of this type have been gaining widespread popularity because of the ease with which they allow the wearer to view both near and distant objects.

It has been suggested that the lenses in narrow lens eyeglasses be made rimless at the top so that the wearer's line of sight is not obstructed when he looks straight ahead at distant objects. In order to maintain the lenses in place on such a frame, external mounting devices have been utilized. For example, screws which pass through the lenses and which are threadedly received in the frame have been used to connect the lenses with the frame. Alternatively, the lenses have been cemented in place. However, many problems have been encountered by the use of such devices.

It has been found that the provision of screw-receiving bores in such lenses substantially weakens the lenses and makes them susceptible to breakage. On the other hand, the procedure involved in cementing a lens in position is extremely time-consuming and, therefore, uneconomical for the average optometrist.

Accordingly, the desideratum of the present invention is to provide eyeglasses having half-lenses wherein the lenses are releasably retained by the frame without the use of external fastening devices such as screws or cement.

Another object of the present invention is to provide eyeglasses having narrow lenses in which the lenses easily and quickly may be removed and replaced.

A further object and feature of the present invention resides in the novel details of construction which provide eyeglasses of the type described in which lenses may be mounted on or removed from a supporting frame simply by flexing the frame, thereby eliminating the need to remove and replace external fastening devices and the consequent loss in time resulting from such operations.

Still another object of the invention is the provision of a frame for eyeglasses of the type described which can be made entirely by an injection molding operation, without the need for incorporating separate lens fastening means with the frame.

In furtherance of the above objects, the eyeglasses of the present invention include a frame which is fabricated from a flexible and resilient material such as plastic. The frame comprises a bridge portion having a top member and legs depending from the ends of the top member. Connected to the lower ends of the legs are oppositely extending arms. Temples are hingedly connected to the outer ends of the arms to provide a means for securing the eyeglasses to the head of the wearer.

Formed in each leg and its respective arm is a continuous open-sided slot. The end of each slot formed in the leg of the bridge portion terminates in a substantially horizontal end wall, i.e., an end wall parallel to its respective arm, and the other end of each slot formed in the arm of the frame terminates in an undercut end wall parallel to its respective leg. Each slot receives a lens therein. The lenses are sized so that the top edge of each lens abuts the horizontal end wall of its respective slot and the opposite corner of each lens is received beneath the undercut end wall of the slot so that the end walls of the slot overlie and grip the terminals of each lens.

The slots are sized so that the undercut end wall of each slot exerts a biasing force on the lens, the biasing force being in a direction which causes the lens to be firmly forced against the horizontal face of the slot. Accordingly, the lenses will be maintained in place on the frame without the use of external fastening devices which, as noted above, may result in a weakening of the lens or may require a cumbersome mounting operation. Moreover, lenses may easily be removed from, or mounted on, the frame simply by flexing the frame so that the undercut end wall is moved away from the lens. Hence, valuable time is not wasted by fastening a lens in place by the use of external fastening devices such as cement and the like.

An additional feature of the invention, in one of its embodiments, is the employment of blocks of various sizes which may be fitted into the slot against the horizontal end wall to reduce the effective length of the slot and thereby enable the frame to accommodate lenses having different vertical dimensions.

Some eyeglasses in the past have employed resilient means to mount a lens on the frame. Usually, springs not integrally formed with the frame were employed. This type of construction is relatively expensive due to the cost of the springs and the labor cost necessary to affix them to the frame. In cases where the inherent resilience of the frame was used to hold the lens, the frame extended around the top and/or sides of the lens, thus partially obstructing the vision of the wearer.

It is, therefore, an additional object of the invention to provide eyeglasses of the type described wherein the lenses are gripped and held in place solely by the inherent resilience of the frame material, but in which the frame obstructs neither the peripheral vision of the wearer nor his vision over the tops of the lenses.

Other features and advantages of the present invention will become more apparent from a consideration of the following detailed description when taken in conjunction with the accompanying drawings, in which.

Figures 1, 7:
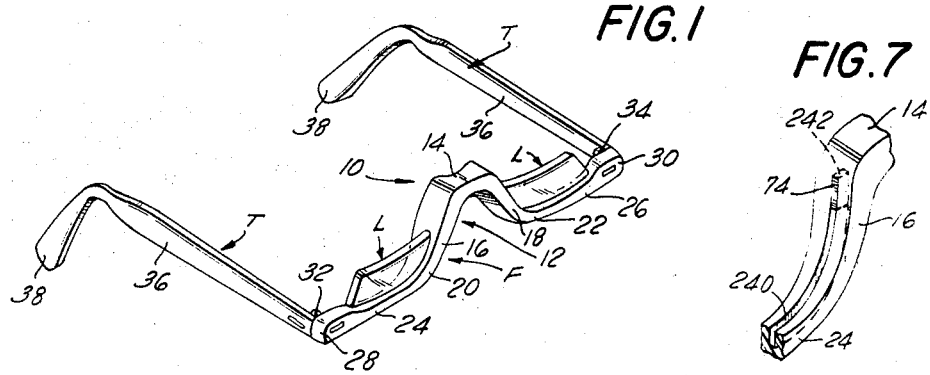
FIG. 1 is a perspective view of eyeglasses constructed according to the present invention.
FIG. 7 is a fragmentary perspective view of a frame for eyeglasses showing an additional feature of the invention.

The eyeglasses of the present invention are shown in FIG. 1 and are designated generally by the reference numeral 10. The eyeglasses 10 comprise a frame F which carries a pair of lenses L. Hingedly connected to the ends of the frame F are temples T which are adapted to hold the frame F on the face of the wearer. The frame F includes a bridge portion which is designated generally by the reference numeral 12. The bridge portion 12 is to be distinguished from the bridge portion of conventional eyeglasses because the bridge portion 12 has an unusually great depth. Moreover, it is to be noted that the lenses L have a substantially smaller vertical dimension than conventional eyeglass lenses. Accordingly, as noted hereinabove, a person using the eyeglasses 10 may look down through the lenses L when he wishes to view an object which is close to his eyes, or he may look above the top edge of the lenses L when he wishes to view a distant object so that his vision is not blurred or distorted by the lenses L. While the benefits to be obtained from eyeglasses of this type are readily apparent various problems have been encounterd in attempting to mount the lenses L on the frame F.

In accordance with the present invention, the bridge portion 12 includes a top member 14 and legs or nasal portions 16 and 18 which depend from the ends of the top member 14. The legs 16 and 18 are adapted to engage the sides of the nose of the wearer in the conventional manner. The legs 16 and 18 include curved portions 20 and 22 which terminate in laterally extending arms 24 and 26. The arms 24 and 26 extend in opposite directions in a substantially horizontal plane. Consequently, the arms do not obstruct the peripheral vision of the wearer.

Figure 2:
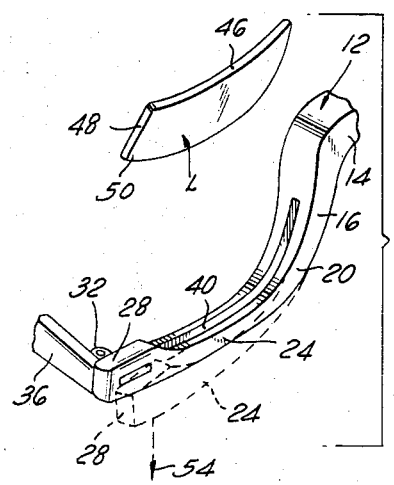
FIG. 2 is a fragmentary, perspective, exploded view, on a larger scale, of the eyeglasses illustrating the flexing of the frame to remove or insert lenses.

In practice, the bridge portion 12 (which includes the top member 14, the depending legs 16 and 18, and the curved portions 20 and 22) and the arms 24 and 26 are integrally formed from a flexible and resilient material such as a suitable plastic. Additionally, the frame F is ideally suited to be produced by an injection molding technique. Moreover, as shown in FIGS. 1 and 2, the member 14 and the upper portion of the legs 16 and 18 have a substantially large cross-sectional area. This provides the frame with sufficient strength, as well as a relatively broad seating area for comfortable engagement with the nose of the wearer. The arms 24 and 26 may be flexed downwardly relative to the legs 16 and 22 for reasons which will become apparent from a consideration of the discussion hereinafter. However, the arms will immediately spring back to their normal position, when they are released, due to the resilience of the material of which the frame F is composed.

The arms 24 and 26 terminate in outer end portions 28 and 30. The temples T are connected to the portions 28 and 30 of the frame F by hinges 32 and 34, respectively, in the conventional manner. Each one of the temples T includes a laterally extending arm 36 and a downwardly inclined hook portion 38. The temples T are conventional and are adapted to extend alongside the temples of the wearer with the hook portions 38 being received over the ears thereby to maintain the frame F in place on the face of the wearer.

In view of the fact that the eyeglasses 10 are symmetrical about a vertical plane passing through the center of the top member 14 of the bridge portion 12, only the left-hand portion of the eyeglasses, as shown in FIG. 1, will be described in detail. It is to be understood that the right-hand portion of the eyeglasses is identical in construction and structural arrangement, but in mirror-image relation, to the left-hand portion.

Figure 3:
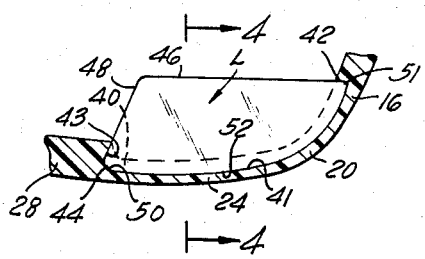
FIG. 3 is a fragmentary, vertical sectional view of the eyeglasses of FIG. 1, showing a lens mounted on the frame.

As shown in FIGS. 2 and 3, a continuous opensided slot or groove 40 is provided in the upper edge of the frame F. The slot 40 extends from a point spaced from the end of the arm 24, along the entire length of the arm 24 and the leg 16, to a point spaced below the top member 14. Additionally, bottom wall 41 of the slot or groove 40 follows the contours of the frame F so that the depth of the slot 40 is constant throughout its length. The upper end of the slot 40 terminates in a substantially horizontal face or wall 42 (FIG. 3) which extends from the bottom wall 41 of the slot 40 to the open side thereof. The lower or other end of the slot 40 terminates in a wall 43 arranged at an acute angle to the arm 24 thereby providing an undercut portion or recess 44 adjacent the bottom of the slot. The slot 40 is adapted to receive and retain a lens L therein without the necessity for external fastening devices.

Figure 4:
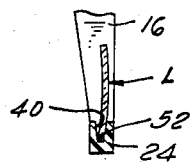
FIG. 4 is a sectional view taken along the line 4—4 of FIG. 3.

The lens L includes a substantially horizontal top edge 46 and a downwardly and outwardly inclined side edge 48. The bottom edge of the lens L is formed by a curved edge 52 which extends from the lower end of side edge 48 to the top edge 46 of the lens. The edge 52 is curved complementary to the bottom wall 41 of the slot 40 so that the lens L may be received in the slot 40 as shown in FIGS. 3 and 4. At its ends, the bottom edge 52 forms, together with the adjacent portions of edges 48 and 46, attenuated terminals or corners 50 and 51, respectively. Additionally, as shown in FIG. 4, the lens L is concave outwardly to provide the necessary visual correction for the wearer. Moreover, the peripheral length of the curved edge 52 is slightly in excess of the length of the bottom wall 41 of the slot 40 for reasons which will become apparent from a consideration of the following discussion.

In operation, the lens L is mounted on the frame F by initially inserting the corner 51 of the lens L into the slot 40 so that the horizontal wall 42 engages the top edge 46 of the lens L. The remainder of the lens is then swung downwardly about the point 51 into the slot 40. However, as noted above, the peripheral extent of the curved edge 52 of the lens L is slightly in excess of the length of the bottom wall 41 of the slot 40. Accordingly, as the lens L is moved downwardly into the slot 40 the corner 50 engages the top surface of the end portion 28 above the recess 44. The arm 24 is then flexed downwardly relative to the leg 16, in the direction indicated by arrowhead 54 in FIG. 2, until the arm 24 assumes the position indicated by the phantom lines of FIG. 2. Thus, the end wall 43 of the slot 40 which includes the recess 44 moves away from the horizontal end wall 42 thereby essentially increasing the effective length of the bottom wall 41 of the slot 40.

When the arm 24 has been flexed to the position indicated by the phantom lines of FIG. 2, the lens L may easily be pressed down into the slot 40 so that the corner 50 of the lens enters the recess 44. When the lens has been fully inserted into the groove 40, the arm 24 is released. Thus, due to the resiliency of the frame F, the arm 24 once again assumes its normal position, as indicated by the solid line position of FIG. 2. Although in the above description the corner 51 of the lens is inserted into the slot 40 first, obviously the corner 50 could be inserted first into recess 44, the arm 24 flexed, and the lens pivoted about corner 50 until the corner 51 snaps under end wall 42.

In light of the fact that the bottom wall 41 of the slot 40 is smaller than the length of the edge 52 of the lens L, the end wall 43 of the slot 40 abuts the edge 48 of the lens L and exerts a biasing force on the lens L which tends to move the lens inwardly and upwardly in the slot 40. Consequently, this biasing force causes the end portion of the top edge 46 of the lens L to firmly engage the horizontal end wall 42 of the slot 40. Accordingly, the end walls 42 and 43 of the slot 40 exert oppositely directed forces on the lens L which act to retain the lens L on the frame F without the need for utilization of external fastening devices.

If it is desired to remove a lens from the frame F either to replace a broken lens or to exchange one lens for another lens having a different radius of curvature, the above-described procedure simply is reversed. That is, the arm 24 is flexed downwardly relative to the leg 16 to effectively increase the distance between the end walls 43 and 42 of the slot 40. The lens L is then pivoted about its corner 51 until the corner 50 of the lens is disengaged from the recess 44. Thereafter, the lens is free to be removed completely from the slot 40.

Thus, eyeglasses having narrow lenses which provide the wearer with an efficient means for observing near objects through the lenses of the eyeglasses and for observing far objects by looking over the lenses of the eyeglasses have been provided in which the lenses may be easily and quickly mounted on or removed from the frame without the need for external fastening devices or tools of any kind.

Figure 5:
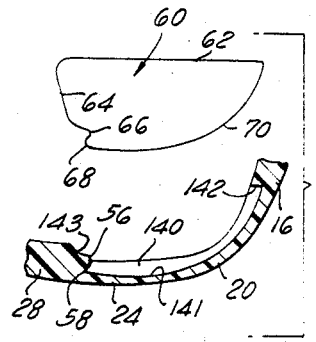
FIG. 5 is a fragmentary, exploded, vertical sectional view of a modified embodiment of eyeglasses constructed in accordance with the present invention.
Figure 6:
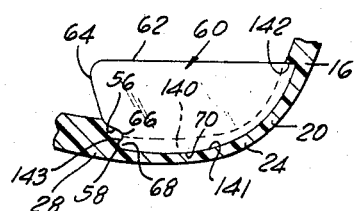
FIG. 6 is a vertical sectional view of the eyeglasses shown in FIG. 5, illustrating the lens mounted on the frame.

FIGS. 5 and 6 illustrate a modified embodiment of the present invention. Similarly to FIGS. 2 and 3, FIGS. 5 and 6 illustrate one-half of the eyeglasses. However, the eyeglasses are symmetrical about their midpoint so that the other half of the glasses will be identical in construction to the portion shown in FIGS. 5 and 6. Moreover, the construction of the frame shown in FIGS. 5 and 6 is similar in all details to the frame F illustrated in FIGS. 1–4, with the exception of the open-ended lens-receiving slot 140. Therefore, the reference characters in FIGS. 5 and 6 indicate elements which correspond to elements similarly numbered in FIGS. 1–4.

Provided in the arm 24 and extending upwardly into the leg 16, which includes the curved portion 20, is a continuous open-sided slot or groove 140. The upper end of the slot 140 terminates in a substantially horizontal end wall 142 which extends from the bottom wall 141 of the slot 140 to the outer edge of the frame F. The other end of the slot 140 terminates in an end wall 143. Provided in the wall 143 is an inwardly projecting member 56 which defines an outwardly projecting notch 58 between the member 56 and the bottom wall 141 of the slot 140. The upper portion of the end wall 143 above the member 56 is curved upwardly, as shown in FIG. 5. The slot 140 is adapted to releasably retain therein a lens designated generally by the reference numeral 60.

The lens 60 includes a substantially horizontal top edge 62 similar to the top edge 46 of the lens L. The lens 60 is provided with a downwardly and inwardly inclined side wall 64 which is provided with a bottom portion comprising an inwardly extending notch 66 and an outwardly extending member 68. To put this another way the bottom portion of the edge 64 of the lens 60 is formed complementary to the wall 143 of the slot 140. Curved edge 70, which is formed complementary to the bottom wall 141 of the slot 140, extends between the notched section of the lens 60 and the top edge 52. However, the length of the bottom wall 141 of the slot 140 is slightly less than the length of the edge 70 of the lens 60.

The lens 60 is inserted into the slot 140 in a manner similar to that in which the lens L is inserted into the slot 40. More specifically, the lens 60 is inserted into the slot 140 so that the top edge 62 of the lens engages the end wall 142 of the slot 140. The lens 60 is then pivoted downwardly and the arm 24 is flexed downwardly simultaneously so that the end wall 143 moves away from the end wall 142 of the slot 140 thereby increasing the distances between these walls. Thereafter the lens 60 is pushed into the slot 140 until the member 68 is received in the notch 58 in the arm 24 and the projection 56 is engaged in the notch 66 in the lens 60. The arm 24 is then released and, because of the resiliency of the material comprising the frame, the arm 24 returns to its normal position.

Since the length of the bottom wall 141 of the slot 140 is slightly less than the length of the edge 70 of the lens 60, the wall 143 exerts a force on the lens 60 which is in a direction such that the top edge 62 of the lens 60 is forced securely against the wall 142. Additionally, the interfitting members and notches 56, 58, 66, and 68, engage each other thereby to securely retain the lens L in position on the frame F without the need for external fastening devices. When it is desired to remove the lens 60, the above procedure may be reversed in a manner similar to that associated with removing the lens L from the slot 40.

FIG. 7 shows an embodiment of the invention in which the slot 240 extends upwardly along the leg 16 of the bridge portion a distance greater than the slot 40 of FIGS. 1–3. Thus, the end wall 242 of FIG. 7 is located at a point higher than the end wall 42 of FIGS. 1–3. As a result, the frame of FIG. 7 can accommodate a lens having a greater vertical dimension than the lens L of FIGS. 1–3. However, it is contemplated that the length of the portion of slot 240 located in leg 16 be adjustable so that the frame of FIG. 7 can accommodate lenses having different vertical dimensions. This adjustment is accomplished by employing a block 74 sized and shaped to fit into the slot 240 against the end wall 242. The block 74 effectively shortens the slot, and the lower face of the block becomes the horizontal end wall of the slot. Blocks 74 of various lengths can be employed so that lenses of different heights can be snugly gripped by the frame. If desired, the properly selected block 74 may be cemented in place. However, this is not necessary if the block is sized so that it fits tightly into the slot 240.

What is claimed is:

1. Eyeglasses including a frame in combination with a pair of lenses, said frame comprising a bridge portion having a top member and legs depending from the ends of said top member, a laterally extending arm connected to the lower end of each of said legs, said arms extending in opposite directions, said bridge portion and arms being integrally molded of a flexible plastic material, a temple hingedly connected to the outer ends of said arms, and an open-sided lens-receiving slot in each arm extending into the leg connected thereto, each of said slots having a bottom wall, one end of each of said slots terminating in a substantially horizontal first end wall arranged at an acute angle to the portion of said bottom wall which it meets, the other end of each of said slots terminating in a second end wall arranged at an acute angle to the portion of said bottom wall which it meets; each one of said lenses being received in one of said slots, each of said lenses having a flat upper surface with a portion in engagement with said first end wall of its respective slot, and a flat end surface with a portion in engagement with said second end wall of its respective slot, each corner of each of said lenses adjacent to said slot end walls subtending an angle equal to the angle defined by its respective end wall and said slot bottom wall, and the peripheral length of the portion of each of said lenses engaged by said frame being smooth and devoid of any notches, and being slightly in excess of the length of the bottom wall of its respective slot, whereby said second end wall exerts a biasing force on its respective lens to force the lens against the first end wall to retain the lens firmly in place on said frame.

2. Eyeglasses as defined in claim 1 including a block adapted to fit into said slot against said first end wall in order to reduce the effective length of said slot, said block being held in place by a friction fit and the biasing force of said frame.

References Cited

UNITED STATES PATENTS

| | | | |
|---|---|---|---|
| 2,254,746 | 9/1941 | Line | 351—106 |
| 2,389,742 | 11/1945 | Rey | 351—103 |
| 2,398,137 | 4/1946 | Dunham | 351—106 |
| 2,519,852 | 8/1950 | Ring | 351—106 X |
| 2,880,649 | 4/1959 | Eisler | 351—61 |
| 3,017,806 | 1/1962 | Stolper | 351—106 |

DAVID SCHONBERG, Primary Examiner

J. W. LEONARD, Assistant Examiner

U.S. Cl. X.R.

351—106